United States Patent
Pilon et al.

(10) Patent No.: US 12,145,224 B2
(45) Date of Patent: Nov. 19, 2024

(54) SYSTEM AND METHOD OF FORMING A WEAR SURFACE FOR A WHEEL OF A RAIL VEHICLE

(71) Applicant: Amsted Rail Company, Inc., Chicago, IL (US)

(72) Inventors: Richard Aaron Pilon, Cheboygan, MI (US); John D. Oliver, Flossmoor, IL (US); Patricio Fernando Mendez, Edmonton (CA); Carter Trautmann, Edmonton (CA)

(73) Assignee: Amsted Rail Company, Inc., Chicago, IL (US)

( * ) Notice: Subject to any disclaimer, the term of this patent is extended or adjusted under 35 U.S.C. 154(b) by 0 days.

(21) Appl. No.: 18/494,948

(22) Filed: Oct. 26, 2023

(65) Prior Publication Data

US 2024/0149367 A1     May 9, 2024

Related U.S. Application Data

(60) Provisional application No. 63/423,522, filed on Nov. 8, 2022.

(51) Int. Cl.
| | |
|---|---|
| *B23K 9/04* | (2006.01) |
| *B60B 17/00* | (2006.01) |
| *B23K 101/00* | (2006.01) |
| *B23K 101/34* | (2006.01) |
| *B23K 103/04* | (2006.01) |

(52) U.S. Cl.
CPC .............. *B23K 9/048* (2013.01); *B60B 17/00* (2013.01); *B23K 2101/006* (2018.08); *B23K 2101/35* (2018.08); *B23K 2103/04* (2018.08); *B60B 2310/60* (2013.01); *B60B 2310/661* (2013.01)

(58) Field of Classification Search
CPC ... B22F 2202/13; B23K 9/048; B23K 10/027; B23K 2101/35; B23K 2101/006; B23K 2103/04; B60B 2310/60; B60B 2310/616; B60B 2310/661; F05D 2230/90; F05D 2230/31

See application file for complete search history.

(56) References Cited

U.S. PATENT DOCUMENTS

| | | | | |
|---|---|---|---|---|
| 6,073,346 A | * | 6/2000 | Runkle | B60B 17/0068 |
| | | | | 148/583 |
| 6,746,064 B1 | * | 6/2004 | Petrek | B60B 17/0003 |
| | | | | 295/1 |

(Continued)

FOREIGN PATENT DOCUMENTS

| | | | | |
|---|---|---|---|---|
| DE | 3509582 | | 2/1986 | |
| EP | 3354758 | | 8/2018 | |
| WO | WO-2013144043 A1 | * | 10/2013 | ........... B23K 35/004 |

OTHER PUBLICATIONS

Stellite 21 Alloy Technical Data Sheet (Year: 2020).*

(Continued)

*Primary Examiner* — Christopher J. Besler
(74) *Attorney, Agent, or Firm* — Joseph M. Butscher; The Small Patent Law Group LLC

(57) ABSTRACT

A system and a method of forming a wear surface of a wheel of a rail vehicle include depositing one or more alloy powders onto a main body of the wheel, and plasma transfer arc welding the one or more powders to form one or more alloy layers secured to the main body.

20 Claims, 6 Drawing Sheets

(56) References Cited

U.S. PATENT DOCUMENTS

| | | |
|---|---|---|
| 8,662,375 B2 | 3/2014 | Mercier |
| 9,434,019 B2 | 9/2016 | Keefe |
| 2013/0197683 A1* | 8/2013 | Zhang .................... B22F 10/66 700/96 |

OTHER PUBLICATIONS

Machine Translation of WO 2013/144043 A1 (Year: 2013).*
International Search Report and Written Opinion for PCT/US2023/078149, dated Dec. 11, 2023.

* cited by examiner

SYSTEM AND METHOD OF FORMING A WEAR SURFACE FOR A WHEEL OF A RAIL VEHICLE

CROSS-REFERENCE TO RELATED APPLICATIONS

This application relates to and claims priority benefits from U.S. Provisional Patent Application No. 63/423,522, filed Nov. 8, 2022, which is hereby incorporated by reference in its entirety.

FIELD OF THE DISCLOSURE

Examples of the present disclosure generally relate to systems and methods of forming a wear surface for a wheel of a rail vehicle.

BACKGROUND OF THE DISCLOSURE

Rail vehicles travel along railways, which have tracks that include rails. A rail vehicle includes one or more truck assemblies that support one or more car bodies.

Over time, wheels of rail vehicles may experience wear. Accordingly, portions of the wheels can be repaired. U.S. Pat. No. 8,662,375, entitled "Method and System for Retreading Track Wheel," discloses a wheel resurfacing method and system for resurfacing a worn track wheel to an original profile. U.S. Pat. No. 9,434,019, entitled "Re-Manufacture and Apparatus of Worn Railroad Freight Car and Locomotive Wheels by Rotational Continuous Longitudinal Welding," also discloses a method for re-manufacturing a worn railroad car wheel.

Certain known processes for re-surfacing portions of wheels of rail vehicles are time and labor intensive. Further, such processes can lead to cracks or other anomalies, such as if pre- and/or post-heating processes are not properly followed.

SUMMARY OF THE DISCLOSURE

A need exists for a system and a method for efficiently and effectively forming a wear surface of a wheel of a rail vehicle. Further, a need exists for a system and a method for efficiently and effectively re-surfacing a wear surface of a wheel of a rail vehicle.

With those needs in mind, certain examples of the present disclosure provide a method of forming a wear surface of a wheel of a rail vehicle. The method includes depositing one or more alloy powders onto a main body of the wheel, and plasma transfer arc welding the one or more powders to form one or more alloy layers secured to the main body. In at least one example, the method includes melting the one or more powders and a portion of the wheel under the powders, such as before the plasma transfer arc welding, and/or during the plasma transfer arc welding.

In at least one example, the one or more alloy powders have a different composition than the main body. For example, the main body is formed of carbon steel, and the one or more powders are formed of one or more alloys that differ from carbon steel.

In at least one example, the one or more alloy powders include Carbon (C), Chromium (Cr), Manganese (Mn), Silicon (Si), Molybdenum, and Nickel (Ni).

In at least one example, the one or more alloy powders include a first alloy powder having a first composition, a second alloy powder that differs from the first alloy powder, wherein the second alloy powder has a second composition that differs from the first composition, and a third alloy powder that differs from the first alloy powder and the second alloy powder, wherein the third alloy powder has a third composition that differs from the first composition and the second composition. As a further example, the first alloy powder includes 0.19% Carbon (C), 0.45%-3.1% Chromium (Cr), 0.16%-0.19% Manganese (Mn), 0.15% Silicon (Si), 0.6% Molybdenum (Mo), 2.1% Nickel (Ni), and one or more additional materials, the second alloy powder includes 0.10%-0.25% C, 3.0%-5.4% Cr, 0.21%-0.26% Mn, 0.18% Si, 0.54%-4.9% Mo, 2.1%-3.2% Ni, and one or more additional materials, and the third alloy powder includes 0.13%-0.42% C, 11.6%-12.5% Cr, 0.4% Mn, 0.4% Si, 0.15%-1.2% Mo, 1.4%-4.6% Ni, and one or more additional materials.

In at least one example, the wheel includes an inner rim, an outer rim, and a support rim between the inner rim and the outer rim. The one or more alloy powders are deposited onto the support rim.

Certain examples of the present disclosure provide a wheel of a rail vehicle. The wheel includes a main body, and a wear surface secured to the main body. The wear surface includes one or more alloy layers formed of one or more alloy powders plasma transfer arc welded onto the main body.

Certain examples of the present disclosure provide a method of forming a surface of a component. The method includes depositing one or more alloy powders onto a base structure of the component, and plasma transfer arc welding the one or more powders to form one or more alloy layers secured to the base structure.

DETAILED DESCRIPTION OF THE DISCLOSURE

Figure 1:
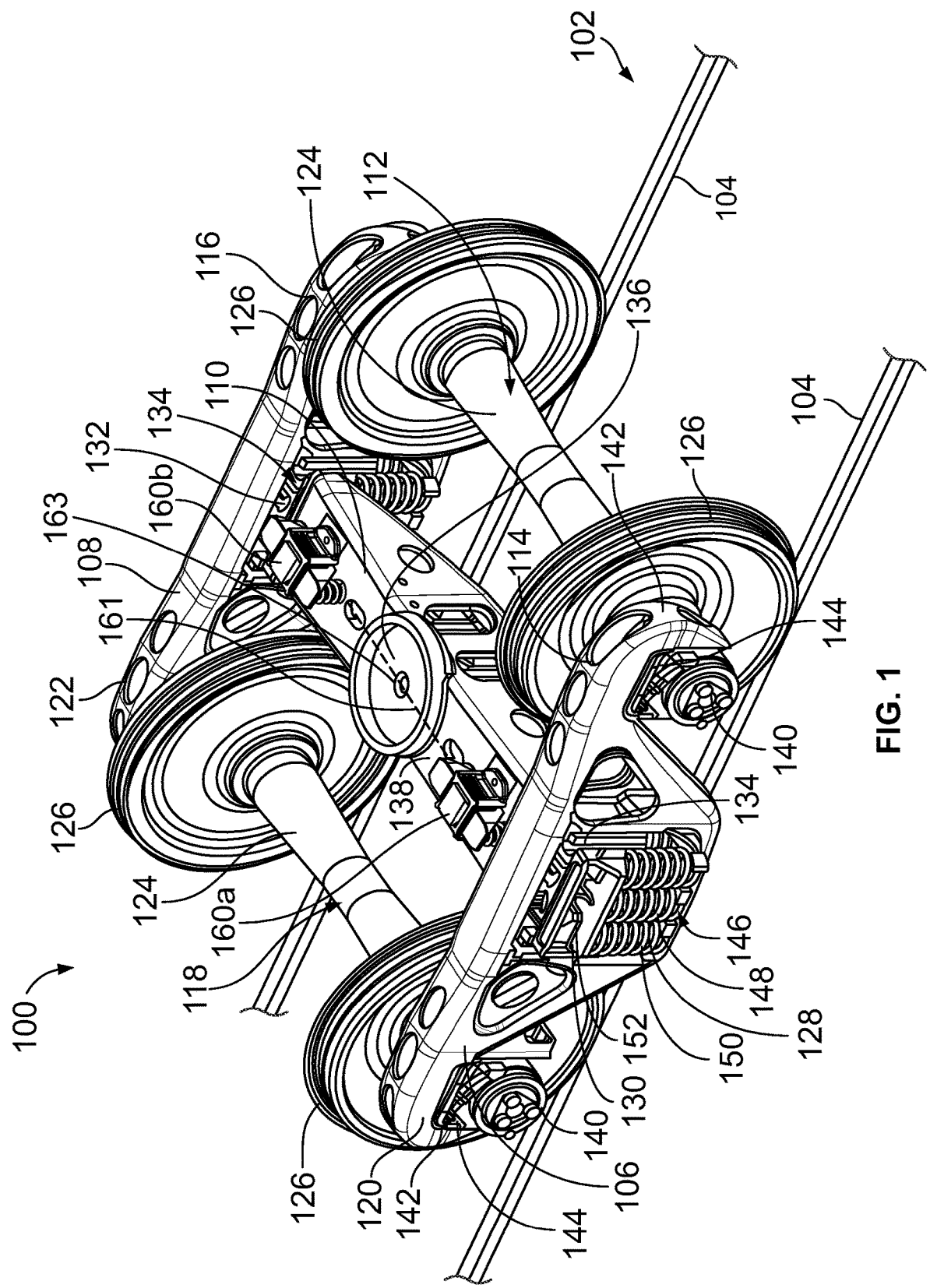
FIG. 1 illustrate an isometric top view of a truck assembly, according to an example of the present disclosure.

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Surface cladding can be used to extend lifetimes of components in heavy wear environments. In applications involving the repair and manufacture of existing parts, hard-facing via plasma, and directed energy welding can be used to increase lifetimes of many high-wear components. However, such hard-facing techniques are limited in relation to applications in which wear resistance cannot be achieved through increased hardness alone. At the same time, weld filler-metal techniques can be used with low transition temperature (LTT) alloys. LTT materials undergo martensitic transitions at relatively low temperatures, thereby creating a potential for dramatic reductions in tensional residual stress and/or generated surface compressive stresses experienced by welded components when used, improving performance, and potentially reducing cracking during a manufacturing process.

Examples of the present disclosure provide systems and methods for surface cladding and the extension of the lifetime of components in unique high-wear applications, such as wheels of rail vehicles. The wheels can be those of locomotives, freight cars, and the like. Traditional hard-facing techniques are limited in relation to such wheels, because if a wheel becomes harder than a rail that supports the wheel, the rail can disproportionately deteriorate, which can lead to a higher maintenance cost than simply replacing a wheel. Accordingly, the use of LTT alloys as a surfacing material can be used to improve wear performance through the introduction of compressive surface residual stresses without increasing hardness.

The systems and methods described herein can be used to provide wear surfaces on existing wheels. For example, existing wheels can be repaired via the methods described herein. As another example, the systems and methods described herein can be used to manufacture new wheels having wear surfaces.

Examples of the present disclosure provide systems and methods that employ a set of alloys of varying compositions for use with rail wheel rims. The set of alloys can include a first or low alloy material of similar composition to a base wheel material, a second or high alloy material configured to increase a potential for LTT without exceeding hardness constraints, and a third or intermediate alloy material. The alloy materials are deposited via plasma transferred arc welding onto main bodies of wheels to form an improved wear surface, such as a tread. The wear surfaces formed by such method exhibit improved resiliency and longevity. Such improvement can be attributed to a potential inversion of residual stresses from tensional stress to compressive stress inside the weld material. The compressive stress is derived from the volumetric expansion associated with the transformation to martensite by the filler material. When this expansion occurs at low temperatures, the remaining thermal contraction is too small to absorb the expansion resulting in a final stress state of compression. It has been found that the application of such materials via plasma transfer arc welding yields little or no hot cracking in plate welds in the alloys and microstructures, suggesting effective martensitic transitions as well as a successful fusion to the dissimilar base material.

FIG. 1 illustrate an isometric top view of a truck assembly 100, according to an example of the present disclosure. The truck assembly 100 is configured to travel along a track 102 having rails 104. The truck assembly 100 includes a first side frame 106 and a second side frame 108, which are spaced apart from one another. A bolster 110 extends between the first side frame 106 and the second side frame 108, and couples the first side frame 106 to the second side frame 108. The bolster 110 shown in FIG. 1 is exemplary, and non-limiting. It is to be understood that the bolster 110 can be sized, shaped, and configured differently than shown.

A first wheel set 112 is rotatably coupled to first ends 114 and 116 of the first side frame 106 and the second side frame 108, respectively, and a second wheel set 118 is rotatably coupled to second ends 120 and 122 of the first side frame 106 and the second side frame 108, respectively. Each of the first and second wheel sets 112 and 118 includes an axle 124 connected to wheels 126. The wheels 126 are supported on the rails 104 and are configured to travel thereon as the axles 124 rotate in relation to the first side frame 106 and the second side frame 108.

The first and second side frames 106 and 108 includes damper or suspension systems 128. For example, the suspension systems 128 include one or more springs, friction shoes, and the like that are configured to dampen forces exerted into and/or by the truck assembly 100 as the truck assembly 100 travels along the track 102. The first and second side frames 106 and 108 shown in FIG. 1 are exemplary, and non-limiting. It is to be understood that the first and second side frames 106 and 108 can be sized, shaped, and configured differently than shown.

The bolster 110 includes ends 130 and 132 (for example a first end 130 and an opposite second end 132), which extend through openings 134 of the side frames 106 and 108. The bolster 110 also includes a bolster center bowl 136 outwardly extending from an upper surface 138. As shown, the bolster center bowl 136 is centrally located on the upper surface 138 of the bolster 110 between the ends 130 and 132.

Ends of the axles 124 are rotatably retained by bearings 140, which are coupled to the side frames 106 and 108. In particular, the wheel sets 112 and 118 are coupled to the side frames 106 and 108 at pedestals 142 of the side frames 106 and 108. The pedestals 142 connect to bearing adapters 144 that connect to the bearings 140.

In at least one embodiment, the suspension systems 128 include spring groups 146 supported within the openings 134 of the side frames 106 and 108. The spring groups 146 include load coils 148 and control coils 150. The load coils 148 support the bolster 110 at the ends 130 and 132. The control coils 150 support friction shoes 152. The damping systems 128 shown in FIG. 1 are exemplary, and non-limiting. It is to be understood that the damping systems 128 can be sized, shaped, and configured differently than shown.

A first side bearing assembly 160a can be mounted on the top surface 138 of the bolster 110 between the bolster center bowl 136 and the end 130. A second side bearing assembly 160b can be mounted on the top surface 138 of the bolster 110 between the bolster center bowl 136 and the end 132. The side bearing assembly 160a and the side bearing assembly 160b may be aligned along a central longitudinal plane 161 of the bolster 110 that passes through a center 163 of the bolster center bowl 136. Each side bearing assembly 160a and 160b may be spaced from the center 163 the same distance, but in opposite directions. The side bearing assemblies 160a and 160b shown in FIG. 1 are exemplary, and non-limiting. It is to be understood that the side bearing assemblies 160a and 160 can be sized, shaped, and configured differently than shown.

Figure 2:
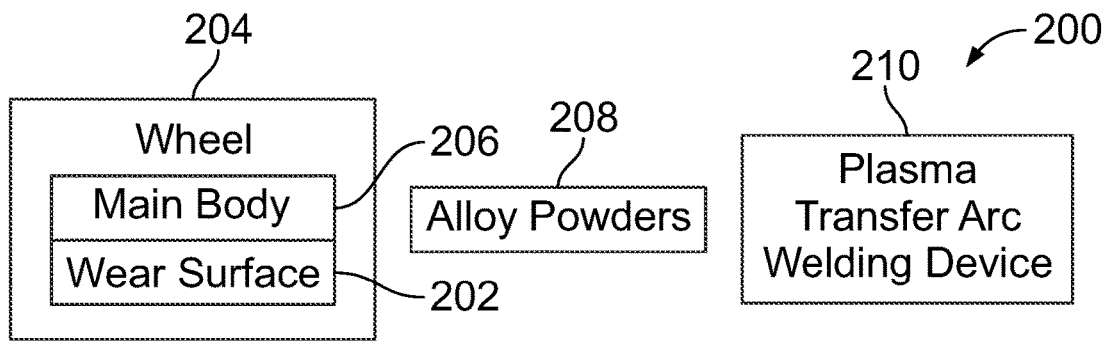
FIG. 2 illustrates a block diagram of a system for forming a wear surface of a wheel, according to an example of the present disclosure.

FIG. 2 illustrates a block diagram of a system 200 for forming a wear surface 202 of a wheel 204, according to an example of the present disclosure. The wheels 126 shown in FIG. 1 are examples of the wheel 204, and are formed as described herein.

The wheel 204 includes a main body 206 and the wear surface 202 secured to the main body 206. The main body 206 can include one or more rims, such as an inner rim, an outer rim, and a support rim. The main body 206 is formed of a material, such as a metal, metallic alloy, or the like. As an example, the main body 206 is formed of carbon steel. The wear surface 202 is formed of one or more materials that differ from the material of the main body 206. As an example, the wear surface 202 can be formed of one or more metallic alloys that differ from the material of the main body 206.

In at least one example, the system 200 can be used to form the wear surface 202 of an initially manufactured wheel 204. In at least one other example, the system 200 can be used to replace the wear surface 202 of an existing wheel 204. For example, the wear surface 202 of an existing wheel 204 can be worn and in need of replacement. As such, the existing wear surface 202 can be removed, such as by machining, and replaced with a new wear surface 202, as described herein.

The wear surface 202 is formed of one or more alloy powders 208 that are plasma transfer arc welded onto the main body 206. For example, the wear surface 202 can be formed of three alloy powders 208. Each of the alloy powders 208 is deposited onto the main body 206, and a plasma transfer arc welding device 210 generates a plasma transfer arc onto the alloy powders 208 to weld the alloy powders 208 onto the main body 206 and form the wear surface 202. In at least one example, each of the alloy powders 208 is deposited onto the main body 206 by being injected into a plasma arc stream emitted from the plasma transfer arc welding device 210. In at least one example, a first alloy powder 208 formed of a first or low alloy that can be similar to the material of the main body 206 is applied to the main body 206, and welded thereon by the plasma transfer arc welding device 210. After the first alloy is welded onto the main body 206 by the plasma transfer arc welding device 210, a second or high alloy is deposited over the first alloy (which has been plasma transfer arc welded onto the main body 206), and plasma transfer arc welded thereon by the plasma transfer arc welding device 210. A third or intermediate alloy can be deposited and plasma transfer arc welded between the first alloy and the second alloy, or optionally over the second alloy. The alloy materials are deposited and welded via plasma transferred arc welding onto the main body 206 to form the wear surface 202. In at least one example, the method includes melting the one or more allow powders and a portion of the main body 206 of the wheel 204 under the allow powders, such as before plasma transfer arc welding, and/or during the plasma transfer arc welding.

In at least one example, the main body 206 of the wheel 204 is formed of a carbon steel. The wear surface 202 can be formed of a first or low alloy, a second or intermediate alloy deposited over the first or low alloy, and a third or high alloy deposited over the second or intermediate alloy. In this manner, the wear surface 202 can be formed of a gradient or differing levels of materials.

The first or low alloy can be an alloy that includes Carbon (C), Chromium (Cr), Manganese (Mn), Silicon (Si), Molybdenum, and Nickel (Ni). As a non-limiting example, the first or low alloy can include 0.19% C, 3.1% Cr, 0.19% Mn, 0.15% Si, 0.6% Mo, 2.1% Ni, and one or more additional materials. A second or intermediate alloy deposited over the first or low alloy can include 0.25% C, 3.0% Cr, 0.21% Mn, 0.18% Si, 4.9% Mo, 3.2% Ni, and one or more additional materials. A third or high alloy can include 0.42% C, 11.6% Cr, 0.4% Mn, 0.4% Si, 1.2% Mo, 4.6% Ni, and one or more additional materials. As another example, the first alloy includes 0.19% Carbon (C), 0.45%-3.1% Chromium (Cr), 0.16%-0.19% Manganese (Mn), 0.15% Silicon (Si), 0.6% Molybdenum (Mo), 2.1% Nickel (Ni), and one or more additional materials; the second alloy includes 0.10%-0.25% C, 3.0%-5.4% Cr, 0.21%-0.26% Mn, 0.18% Si, 0.54%-4.9% Mo, 2.1%-3.2% Ni, and one or more additional materials; and the third alloy includes 0.13%-0.42% C, 11.6%-12.5% Cr, 0.4% Mn, 0.4% Si, 0.15%-1.2% Mo, 1.4%-4.6% Ni, and one or more additional materials. As another example, the first alloy includes 0.02% Carbon (C), 0.45% Chromium (Cr), 0.16% Manganese (Mn), 0.02% Silicon (Si), 0.6% Molybdenum (Mo), 1.9% Nickel (Ni), and one or more additional materials; the second alloy includes 0.10% C, 5.4% Cr, 0.26% Mn, 0.17% Si, 0.54% Mo, 1.9% Ni, and one or more additional materials; and the third alloy includes 0.12% C, 12.5% Cr, 0.41% Mn, 0.37% Si, 0.15% Mo, 1.4% Ni, and one or more additional materials.

Such are examples of alloys, and are not limiting. The alloys can be formed of different percentages of the elements, and/or include different elements.

Optionally, the wear surface 202 can be formed from less than three alloys. For example, a single alloy powder can be deposited onto the main body 206 and plasma transfer arc welded thereon. As another example, only two alloy powders can be deposited and arc welded to form the wear surface 202. As another example, four or more alloy powders can be deposited and arc welded to form the wear surface 202.

As described herein, examples of the present disclosure provide a system 200 that is configured to form a wear surface 202 of a wheel 204. The wear surface 202 is formed by deposition and plasma transfer arc welding of one or more alloy powders 208 onto a main body 206 of the wheel 204. The wheel 204 is formed of a material that differs from the alloy powders 208. It has been found that by plasma transfer arc welding the alloy powder(s) 208 onto the main body 206 to form the wear surface 202 (such as a tread), the resulting wear surface 202 is resilient and more resistant to wear as compared to a wheel having a main body and wear surface formed of the same material.

As described herein, examples of the present disclosure provide a method of forming a wear surface 202 of a wheel 204 of a rail vehicle. The method includes depositing one or more alloy powders 208 onto a main body 206 of the wheel 204, and plasma transfer arc welding the one or more alloy powders 208 to form one or more alloy layers secured to the main body 206.

As an example, the one or more alloy powders 208 include a first alloy powder having a first composition. A second alloy powder differs from the first alloy powder. The second alloy powder has a second composition that differs from the first composition. A third alloy powder differs from the first alloy powder and the second alloy powder. The third alloy powder has a third composition that differs from the first composition and the second composition.

Optionally, the systems and methods described herein can be used in relation to other structures. For example, the systems and methods described herein can be to form a surface of a component other than a wheel of a rail vehicle. The systems and methods described herein can be used to plasma transfer arc weld alloy powders onto a base structure other than a main body of a wheel to form the surface of the component. The components can include rails, side frames, bolsters, pots, pans, pipes, various structures of vehicles and buildings, and/or the like.

Figure 3:
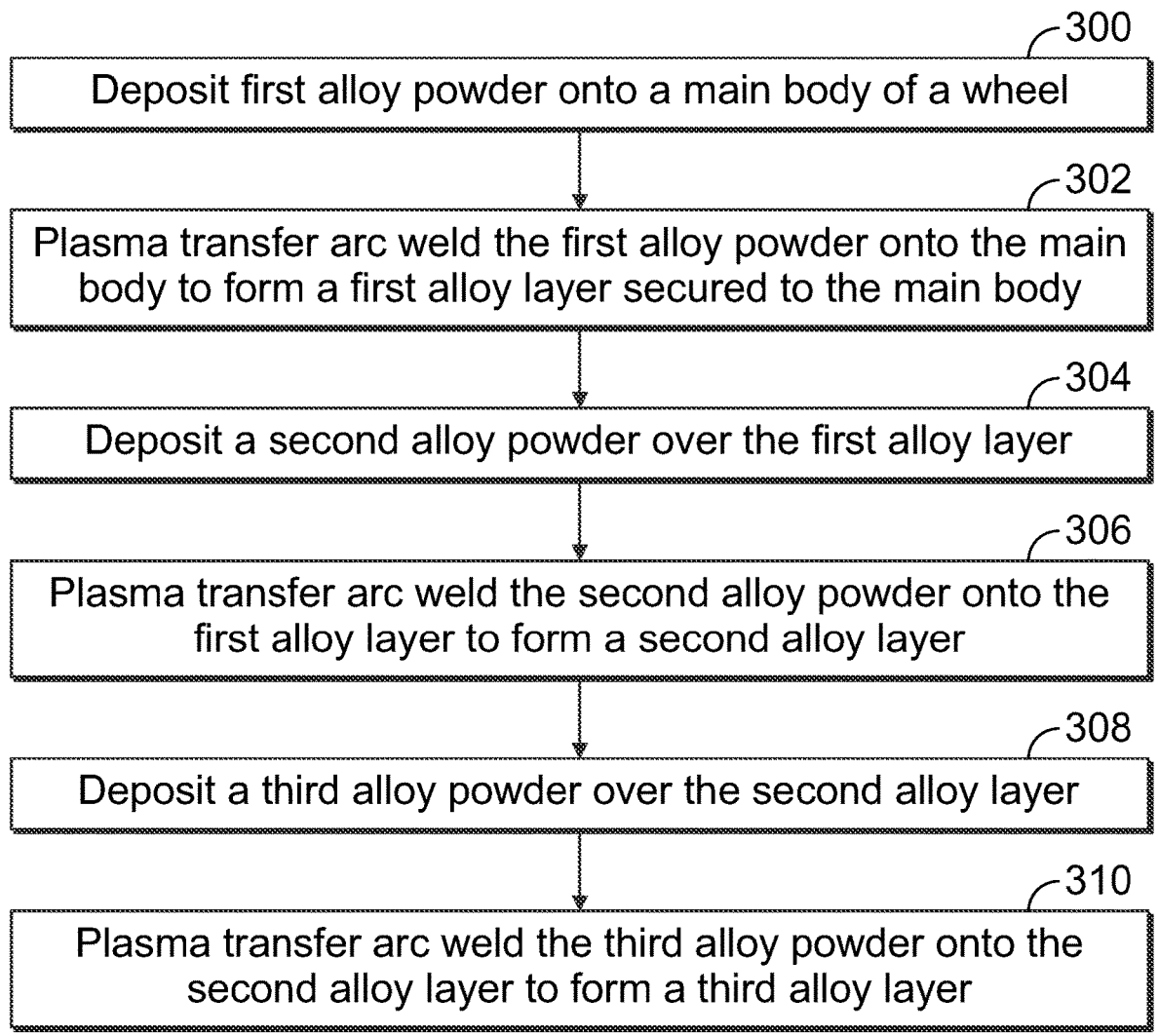
FIG. 3 illustrates a flow chart of a method for forming a wear surface of wheel, according to an example of the present disclosure.

FIG. 3 illustrates a flow chart of a method for forming a wear surface of wheel, according to an example of the present disclosure. At 300, a first alloy powder is deposited onto a main body of a wheel. The first alloy powder is different (that is, has a different composition of materials) than the material of the main body. At 302, the first alloy powder is plasma transfer arc welded onto the main body to form a first alloy layer secured to the main body. In at least one example, the depositing occurs via the plasma arc welding. At 304, a second alloy powder having a different composition than the material of the main body and the first alloy powder is deposited over the first alloy layer. At 306, the second alloy powder is plasma transfer arc welded onto the first alloy layer to form a second alloy layer secured to the first alloy layer and the main body. In at least one example, the depositing occurs via the plasma arc welding. At 308, a third alloy powder having a different composition than the material of the main body, the first alloy powder, and the second alloy powder is deposited over the second alloy layer. At 310, the third alloy powder is plasma transfer arc welded onto the second alloy layer to form a third alloy layer secured to the second alloy layer, the first alloy layer, and the main body. In at least one example, the depositing occurs via the plasma arc welding. Optionally, the method can include more or less alloy layers.

Figure 4:
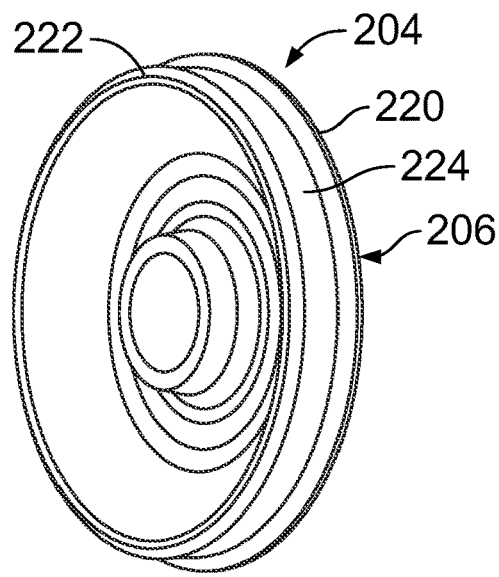
FIG. 4 illustrates an isometric front view of a wheel, according to an example of the present disclosure.
Figure 5:
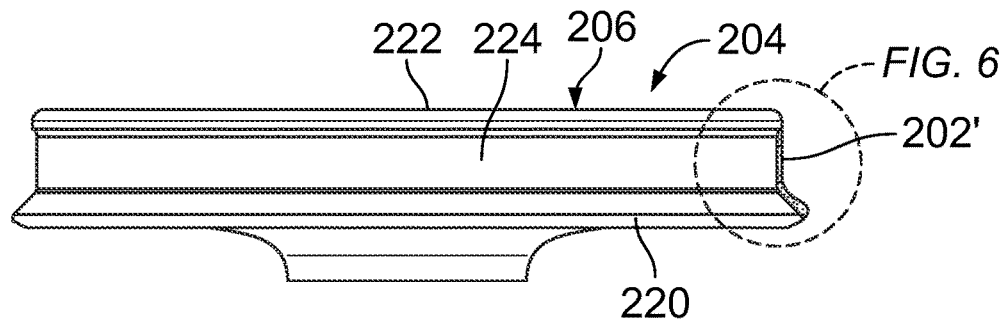
FIG. 5 illustrates a top view of the wheel of FIG. 4.
Figure 6:
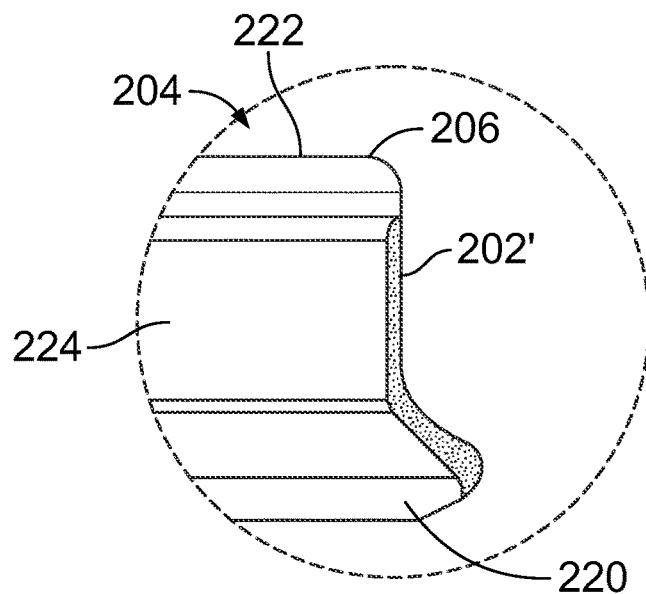
FIG. 6 illustrates a top view of an outer edge of the wheel in Detail 6 in FIG. 5.

FIG. 4 illustrates an isometric front view of a wheel 204, according to an example of the present disclosure. FIG. 5 illustrates a top view of the wheel 204 of FIG. 4. FIG. 6 illustrates a top view of an outer edge of the wheel 204 in Detail 6 in FIG. 5. Referring to FIGS. 4-6, the wheel 204 includes an inner rim 220, an outer rim 222, and a support rim 224 between the inner rim 220 and the outer rim 222. The support rim 224 supports the wear surface 202 (shown in FIG. 2). That is, the alloy powders are deposited onto the support rim 224 and welded thereon, as described herein. A profile 202' of the wear surface 202 is shown in FIGS. 5 and 6. The wear surface 202 extends circumferentially around the wheel 204 over the support rim 224, and between the inner rim 220 and the outer rim 222.

The wear surface 202 can be formed as described herein with respect to an initially manufactured wheel 204. That is, the wear surface 202 can be formed onto an initially formed main body 206. Optionally, the wear surface 202 of an existing wheel 204 can be removed from the main body 206, and a new wear surface 202 can be secured to the main body 206, as described herein.

Figure 7A:
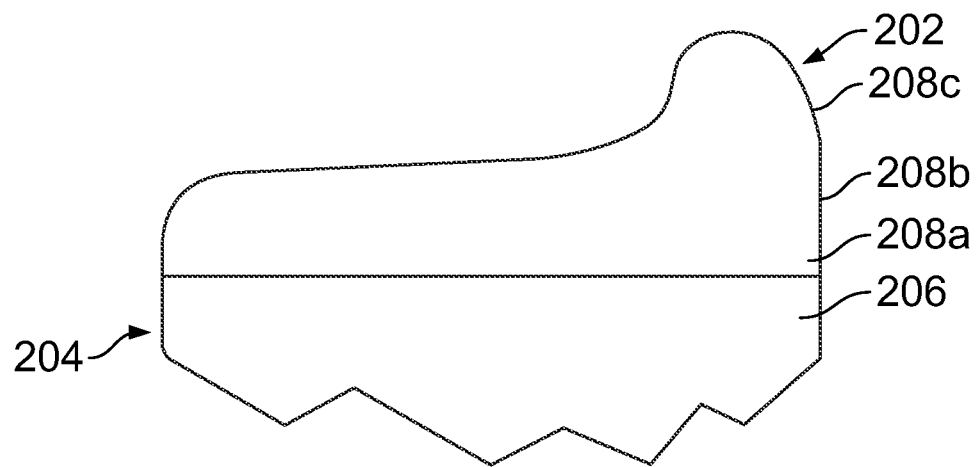
FIG. 7A illustrates a profile of a wear surface secured to a main body of a wheel, according to an example of the present disclosure.

FIG. 7A illustrates a profile of a wear surface 202 secured to a main body 206 of a wheel 204, according to an example of the present disclosure. The wear surface 202 includes three alloy layers formed from three different plasma transfer arc welded alloy powders. For example, a first or low alloy layer 208a is formed by a first allow powder being plasma transfer arc welded onto the main body 206. A second or intermediate alloy layer 208b is formed by a second allow powder being plasma transfer arc welded onto the low alloy layer 208a. A third or high alloy layer 208c is formed by a third allow powder being plasma transfer arc welded onto the second alloy layer 208b. The wear surface 202 can include more or less alloy layers than shown.

Figure 7B:
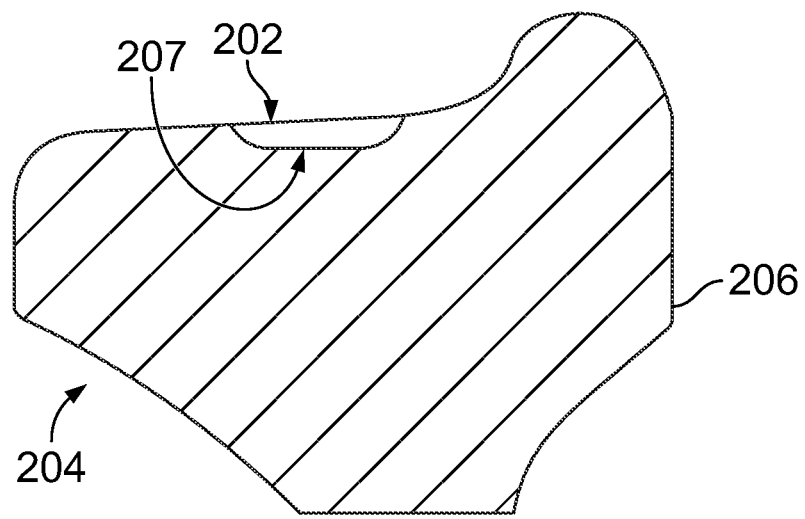
FIG. 7B illustrates a profile of a wear surface secured to a main body of a wheel, according to an example of the present disclosure.

FIG. 7B illustrates a profile of a wear surface 202 secured to a main body 206 of a wheel 204, according to an example of the present disclosure. The wear surface 202 can include three alloy layers formed from three different plasma transfer arc welded alloy powders. The wear surface 202 can include more or less alloy layers than shown. In at least one example, a recess 207 can be formed on a portion of the wheel 204. The recess 207 is configured to receive and retain the alloy layers that are used to form the wear surface 202. For example, the recess 207 can be formed by a 0.25" slot cut circumferentially on and around a surface of the wheel 204. The recess 207 provides a retaining base that allow quick and efficient deposition of the alloy layer(s).

Figure 7C:
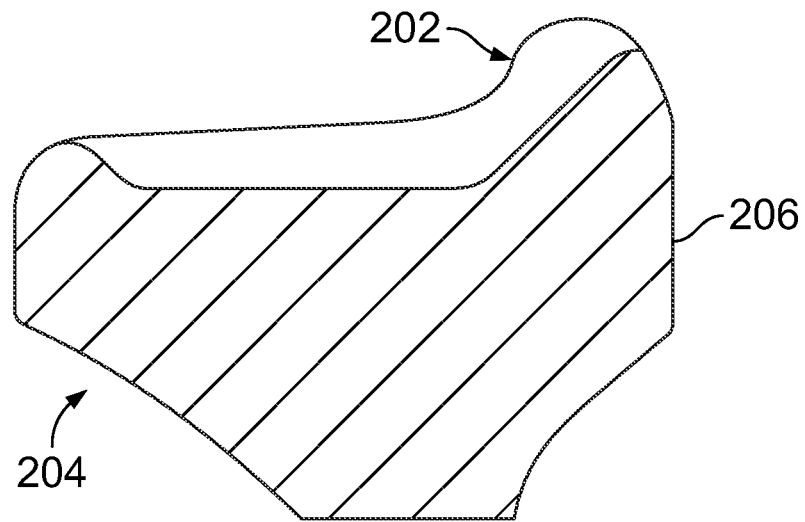
FIG. 7C illustrates a profile of a wear surface secured to a main body of a wheel, according to an example of the present disclosure.

FIG. 7c illustrates a profile of a wear surface 202 secured to a main body 206 of a wheel 204, according to an example of the present disclosure. The wear surface 202 can include three alloy layers formed from three different plasma transfer arc welded alloy powders. The wear surface 202 can include more or less alloy layers than shown.

Figure 8:
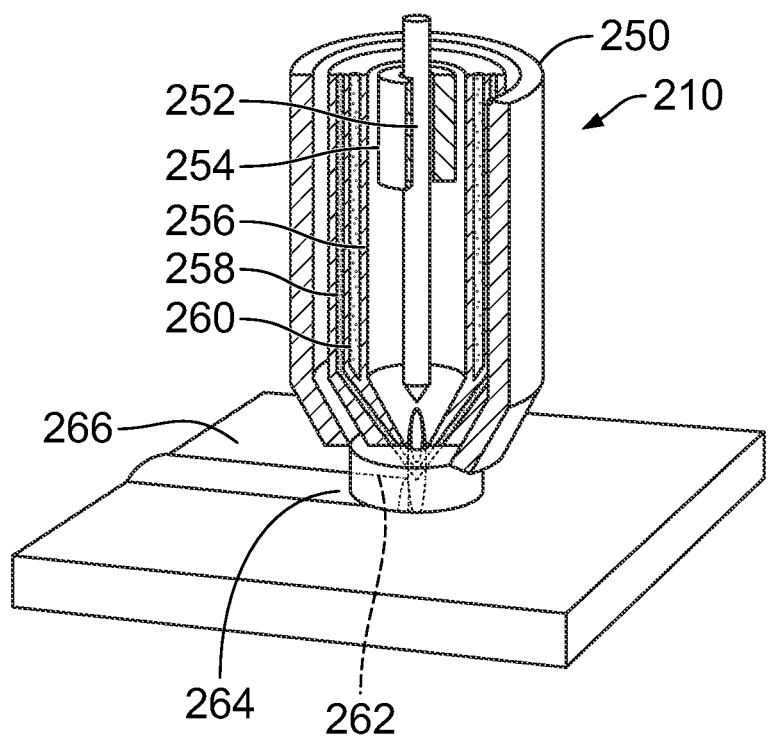
FIG. 8 illustrates an isometric internal view of a plasma transfer arc welding device, according to an example of the present disclosure.

FIG. 8 illustrates an isometric internal view of a plasma transfer arc welding device 210, according to an example of the present disclosure. In at least one example, the plasma transfer arc welding device 210 includes a protection gas nozzle 250, a cathode 252, a current contact 254, a plasma gas 256, a flux and transport gas 258, and a coolant 260 (such as water). The plasma transfer arc welding device 210 generates a plasma arc 262 that welds a material 264 to a base material 266.

Figure 9:
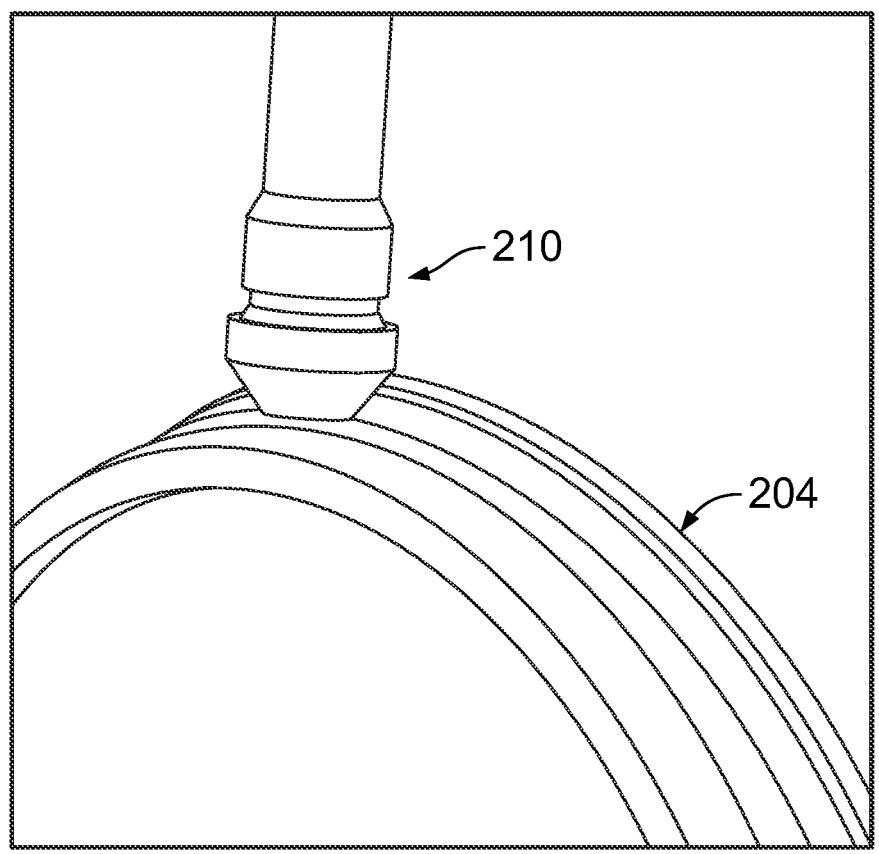
FIG. 9 illustrates a perspective view of a plasma transfer arc welding device in relation to a wheel, according to an example of the present disclosure.

FIG. 9 illustrates a perspective view of a plasma transfer arc welding device 210 in relation to a wheel 204, according to an example of the present disclosure. As described herein, the plasma transfer arc welding device 210 is configured to plasma transfer arc weld one or more powders to form the one or more alloy layers onto the wheel 204, thereby forming a resilient wear surface on the wheel 204. The plasma transfer arc welding device 210 can be a plasma transfer arc torch.

In at least one example, the plasma transfer arc welding device 210 can be operated at a current of 220 A, having a travel speed of 2.4"/minute, emitting plasma gas (such as Argon) at 2.6 l/minute, at a weave of 0.2-0.4 inches at a weave speed of 83-106 inches/minute, with a dwell time of 0.3-0.7 seconds, with powder of 3-5%, and a heat input of approximately 41 Kj/inch. Such parameters for operation are merely exemplary, and non-limiting. The parameters can have different values than listed.

Referring to FIGS. 1-9, the plasma transfer arc welding device 210 is used to provide one or more alloy layers onto a portion of a wheel 204 to provide the wear surface 202. For example, three different alloy layers can be deposited onto the wheel 204 to form a graded alloy having three or more different layers of deposition.

Further, the disclosure comprises embodiments according to the following clauses:

Clause 1. A method of forming a wear surface of a wheel of a rail vehicle, the method comprising:
  depositing one or more alloy powders onto a main body of the wheel; and
  plasma transfer arc welding the one or more powders to form one or more alloy layers secured to the main body.

Clause 2. The method of Clause 1, wherein the one or more alloy powders have a different composition than the main body.

Clause 3. The method of Clauses 1 or 2, wherein the main body is formed of carbon steel, and the one or more powders are formed of one or more alloys that differ from carbon steel.

Clause 4. The method of any of Clauses 1-3, wherein the one or more alloy powders include Carbon (C), Chromium (Cr), Manganese (Mn), Silicon (Si), Molybdenum, and Nickel (Ni).

Clause 5. The method of any of Clauses 1-4, wherein the one or more alloy powders comprise:

a first alloy powder having a first composition;

a second alloy powder that differs from the first alloy powder, wherein the second alloy powder has a second composition that differs from the first composition; and a third alloy powder that differs from the first alloy powder and the second alloy powder, wherein the third alloy powder has a third composition that differs from the first composition and the second composition.

Clause 6. The method of Clause 5, wherein the first alloy powder includes 0.19% Carbon (C), 3.1% Chromium (Cr), 0.19% Manganese (Mn), 0.15% Silicon (Si), 0.6% Molybdenum (Mo), 2.1% Nickel (Ni), and one or more additional materials, wherein the second alloy powder includes 0.25% C, 3.0% Cr, 0.21% Mn, 0.18% Si, 4.9% Mo, 3.2% Ni, and one or more additional materials, and wherein the third alloy powder includes 0.42% C, 11.6% Cr, 0.4% Mn, 0.4% Si, 1.2% Mo, 4.6% Ni, and one or more additional materials.

Clause 7. The method of any of Clauses 1-6, wherein the wheel includes an inner rim, an outer rim, and a support rim between the inner rim and the outer rim, wherein the one or more alloy powders are deposited onto the support rim.

Clause 8. A wheel of a rail vehicle, comprising:

a main body; and a wear surface secured to the main body, wherein the wear surface comprises one or more alloy layers formed of one or more alloy powders plasma transfer arc welded onto the main body.

Clause 9. The wheel of Clause 8, wherein the one or more alloy powders have a different composition than the main body.

Clause 10. The wheel of Clauses 8 or 9, wherein the main body is formed of carbon steel, and the one or more powders are formed of one or more alloys that differ from carbon steel.

Clause 11. The wheel of any of Clauses 8-10, wherein the one or more alloy powders include Carbon (C), Chromium (Cr), Manganese (Mn), Silicon (Si), Molybdenum, and Nickel (Ni).

Clause 12. The wheel of any of Clauses 8-11, wherein the one or more alloy powders comprise:

a first alloy powder having a first composition;

a second alloy powder that differs from the first alloy powder, wherein the second alloy powder has a second composition that differs from the first composition; and a third alloy powder that differs from the first alloy powder and the second alloy powder, wherein the third alloy powder has a third composition that differs from the first composition and the second composition.

Clause 13. The wheel of Clause 12, wherein the first alloy powder includes 0.19% Carbon (C), 3.1% Chromium (Cr), 0.19% Manganese (Mn), 0.15% Silicon (Si), 0.6% Molybdenum (Mo), 2.1% Nickel (Ni), and one or more additional materials, wherein the second alloy powder includes 0.25% C, 3.0% Cr, 0.21% Mn, 0.18% Si, 4.9% Mo, 3.2% Ni, and one or more additional materials, and wherein the third alloy powder includes 0.42% C, 11.6% Cr, 0.4% Mn, 0.4% Si, 1.2% Mo, 4.6% Ni, and one or more additional materials.

Clause 14. The wheel of any of Clauses 8-13, wherein the wheel includes an inner rim, an outer rim, and a support rim between the inner rim and the outer rim, wherein the one or more alloy powders are deposited onto the support rim.

Clause 15. A method of forming a surface of a component, the method comprising:

depositing one or more alloy powders onto a base structure of the component; and plasma transfer arc welding the one or more powders to form one or more alloy layers secured to the base structure.

Clause 16. The method of Clause 15, wherein the one or more alloy powders have a different composition than the base structure.

Clause 17. The method of Clauses 15 or 16, wherein the base structure is formed of carbon steel, and the one or more powders are formed of one or more alloys that differ from carbon steel.

Clause 18. The method of any of Clauses 15-17, wherein the one or more alloy powders include Carbon (C), Chromium (Cr), Manganese (Mn), Silicon (Si), Molybdenum, and Nickel (Ni).

Clause 19. The method of any of Clauses 15-18, wherein the one or more alloy powders comprise:

a first alloy powder having a first composition;

a second alloy powder that differs from the first alloy powder, wherein the second alloy powder has a second composition that differs from the first composition; and a third alloy powder that differs from the first alloy powder and the second alloy powder, wherein the third alloy powder has a third composition that differs from the first composition and the second composition.

Clause 20. The method of Clause 19, wherein the first alloy powder includes 0.19% Carbon (C), 3.1% Chromium (Cr), 0.19% Manganese (Mn), 0.15% Silicon (Si), 0.6% Molybdenum (Mo), 2.1% Nickel (Ni), and one or more additional materials, wherein the second alloy powder includes 0.25% C, 3.0% Cr, 0.21% Mn, 0.18% Si, 4.9% Mo, 3.2% Ni, and one or more additional materials, and wherein the third alloy powder includes 0.42% C, 11.6% Cr, 0.4% Mn, 0.4% Si, 1.2% Mo, 4.6% Ni, and one or more additional materials.

As described herein, examples of the present disclosure systems and methods for efficiently and effectively forming a wear surface of a wheel of a rail vehicle. Further, examples of the present disclosure provide systems and methods for efficiently and effectively re-surfacing a wear surface of a wheel of a rail vehicle.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A method of forming a wear surface of a wheel of a rail vehicle, the method comprising:
   depositing a first alloy powder having a first composition onto a main body of the wheel, wherein the first alloy powder includes 0.19% Carbon (C), 3.1% Chromium (Cr), 0.19% Manganese (Mn), 0.15% Silicon (Si), 0.6% Molybdenum (Mo), and 2.1% Nickel (Ni);
   plasma transfer arc welding the first alloy powder onto the main body of the wheel to form a first alloy layer secured to the main body of the wheel;
   depositing a second alloy powder having a second composition over the first alloy layer, wherein the second composition differs from the first composition, wherein the second alloy powder includes 0.25% C, 3.0% Cr, 0.21% Mn, 0.18% Si, 4.9% Mo, and 3.2% Ni; and
   plasma arc welding the second alloy powder onto the first alloy layer to form a second alloy layer.

2. The method of claim 1, further comprising:
   depositing a third alloy powder having a third composition over the second alloy layer, wherein the third composition differs from the first composition and the second composition; and
   plasma transfer arc welding the third alloy powder onto the second alloy layer to form a third alloy layer.

3. The method of claim 2, wherein each of the first alloy powder, the second alloy powder, and the third alloy powder has a different composition than the main body.

4. The method of claim 1, wherein the main body is formed of carbon steel.

5. The method of claim 2, wherein each of the first alloy powder and the second alloy powder further includes one or more additional materials, and wherein the third alloy powder includes 0.42% C, 11.6% Cr, 0.4% Mn, 0.4% Si, 1.2% Mo, 4.6% Ni, and one or more additional materials.

6. The method of claim 1, wherein the wheel includes an inner rim, an outer rim, and a support rim between the inner rim and the outer rim.

7. A method of forming a surface of a component, the method comprising:
   depositing a first alloy powder having a first composition onto a base structure of the component, wherein the first alloy powder includes 0.19% Carbon (C), 3.1% Chromium (Cr), 0.19% Manganese (Mn), 0.15% Silicon (Si), 0.6% Molybdenum (Mo), and 2.1% Nickel (Ni);
   plasma transfer arc welding the first alloy powder onto the base structure of the component to form a first alloy layer secured to the base structure of the component;
   depositing a second alloy powder having a second composition over the first alloy layer, wherein the first composition differs from the second composition, wherein the second alloy powder includes 0.25% C, 3.0% Cr, 0.21% Mn, 0.18% Si, 4.9% Mo, and 3.2% Ni; and
   plasma arc welding the second alloy powder onto the first alloy layer to form a second alloy layer.

8. The method of claim 7, further comprising:
   depositing a third alloy powder having a third composition over the second alloy layer, wherein the third composition differs from the first composition and the second composition; and
   plasma transfer arc welding the third alloy powder onto the second alloy layer to form a third alloy layer.

9. The method of claim 8, wherein each of the first alloy powder, the second alloy powder, and the third alloy powder has a different composition than the base structure.

10. The method of claim 7, wherein the base structure is formed of carbon steel.

11. The method of claim 8, wherein each of the first alloy powder and the second alloy powder includes one or more additional materials, and wherein the third alloy powder includes 0.42% C, 11.6% Cr, 0.4% Mn, 0.4% Si, 1.2% Mo, 4.6% Ni, and one or more additional materials.

12. A method of forming a wear surface of a wheel of a rail vehicle, the method comprising:
   depositing alloy powders onto a main body of the wheel, wherein the alloy powders comprise:
      a first alloy powder including 0.19% Carbon (C), 3.1% Chromium (Cr), 0.19% Manganese (Mn), 0.15% Silicon (Si), 0.6% Molybdenum (Mo), and 2.1% Nickel (Ni);
      a second alloy powder including 0.25% C, 3.0% Cr, 0.21% Mn, 0.18% Si, 4.9% Mo, and 3.2% Ni; and
      a third alloy powder including 0.42% C, 11.6% Cr, 0.4% Mn, 0.4% Si, 1.2% Mo, and 4.6% Ni; and
   plasma transfer arc welding the alloy powders to form one or more alloy layers secured to the main body.

13. The method of claim 12, wherein each of the first alloy powder, the second alloy powder, and the third alloy powder further comprises one or more additional materials.

14. The method of claim 12, wherein each of the first alloy powder, the second alloy powder, and the third alloy powder has a different composition than the main body.

15. The method of claim 12, wherein the main body of the wheel is formed of carbon steel.

16. The method of claim 12, wherein the wheel includes an inner rim, an outer rim, and a support rim between the inner rim and the outer rim, wherein the first alloy powder is deposited onto the support rim.

17. A method of forming a surface of a component, the method comprising:
depositing alloy powders onto a base structure of the component, wherein the alloy powders comprise:
a first alloy powder including 0.19% Carbon (C), 3.1% Chromium (Cr), 0.19% Manganese (Mn), 0.15% Silicon (Si), 0.6% Molybdenum (Mo), 2.1% and Nickel (Ni);
a second alloy powder including 0.25% C, 3.0% Cr, 0.21% Mn, 0.18% Si, 4.9% Mo, and 3.2% Ni; and
a third alloy powder including 0.42% C, 11.6% Cr, 0.4% Mn, 0.4% Si, 1.2% Mo, and 4.6% Ni; and
plasma transfer arc welding the one or more alloy powders to form one or more alloy layers secured to the base structure.

18. The method of claim 17, wherein each of the first alloy powder, the second alloy powder, and the third alloy powder further comprises one or more additional materials.

19. The method of claim 17, wherein each of the first alloy powder, the second alloy powder, and the third alloy powder has a different composition than the base structure.

20. The method of claim 17, wherein the base structure is formed of carbon steel.

* * * * *